(12) United States Patent
Lu

(10) Patent No.: US 7,467,156 B2
(45) Date of Patent: Dec. 16, 2008

(54) DATA FILE EDITING DEVICE FOR COMPUTER SYSTEMS

(75) Inventor: Li-Chih Lu, No. 17 Lane 22, SungBo Street, Banciao City, Taipei County 220 (TW)

(73) Assignee: Li-Chih Lu (TW)

( * ) Notice: Subject to any disclaimer, the term of this patent is extended or adjusted under 35 U.S.C. 154(b) by 283 days.

(21) Appl. No.: 11/434,912

(22) Filed: May 17, 2006

(65) Prior Publication Data

US 2007/0016623 A1    Jan. 18, 2007

(51) Int. Cl.
*G06F 17/30* (2006.01)

(52) U.S. Cl. .......................... 707/102; 707/1; 707/100; 707/101

(58) Field of Classification Search ...................... 707/1, 707/3, 100, 101, 102
See application file for complete search history.

(56) References Cited

U.S. PATENT DOCUMENTS

| | | | | |
|---|---|---|---|---|
| 6,167,411 A | * | 12/2000 | Narayanaswamy | 715/217 |
| 7,071,942 B2 | * | 7/2006 | Zaima et al. | 345/473 |
| 7,224,363 B2 | * | 5/2007 | Kamiyama | 345/440 |
| 2005/0030300 A1 | * | 2/2005 | Tseng | 345/204 |

\* cited by examiner

*Primary Examiner*—Cam-Linh Nguyen
(74) *Attorney, Agent, or Firm*—Venable LLP; Raymond J. Ho

(57) ABSTRACT

A data file editing device for computer systems that allows users to edit and utilize content of data files in a computer. The device has a user interface that includes one displaying region, one data utilization region and one data edition region; a data utilization controller to define classification structure of data files, to display data file structure in said data utilization region and to display content of data files in said displaying region; and a data edition controller to define classification structure of edition tables, to display edition table structure in said data edition region and to display content of edition tables in said displaying region. The data file structure and edition table structure are display separately.

6 Claims, 5 Drawing Sheets

DATA FILE EDITING DEVICE FOR COMPUTER SYSTEMS

FIELD OF THE INVENTION

The present invention relates to a data file editing device for computer systems, especially to a data file editing device that processes data edition and data display separately.

BACKGROUND OF THE INVENTION

In the computer system, the data file editing device is used to allow users to establish data files, to modify, delete and review data in the data files and to calculate, analyze, compare and otherwise use the data. In the conventional data file editing devices for the computer system, a user interface is provided. The user interface allows users to preview the functions of the editing system and to edit (including establishing, adding, modifying and deleting, hereinafter collectively "edit" or "editing") data in data files. The user interface also allows users to view, calculate, analyze, compare or otherwise utilize the content of the data files. In these conventional systems, data files are displayed in a tree type structure or other hierarchic structures to help users to allocate desired files according to their positions in the classification system used. The conventional data file editing device may further provide a linking tool so that, when one or more files are selected, the content of the files may be displayed in the user interface, always in a table, in columns or in other form of display. A conventional data file editing device may also provide an analysis tool to allow the user to analyze the content of the data files when the content is being displayed. An editing tool is also provided to allow users to input, modify, delete and otherwise edit the content being displayed in the user interface. When the editing activities are completed, the user may use the editing tool to save the edited content into the same file or to a newly established file in the computer system.

In the conventional data file editing device, some drawbacks are found. First, the conventional system users utilize and edit the data files through the same user interface. In the user interface, all function keys relating to editing functions and other utilizations are displayed in. For those who don't have the authority or the intention to use particular editing functions, the functions shown in the user interface meant nothing to them. For system managers, exposing function keys to unauthorized users brings risks to their authorization control. In addition, for those who are authorized or intend to use particular editing functions, the tree-type or hierarchic classification system does not work friendly.

To allocate a desired function key is not easy. The conventional user interface makes allocating a function key time consuming.

OBJECTIVES OF THE INVENTION

The objective of this invention is to provide a new data file editing device for computer systems.

Another objective of this invention is to provide a data file editing device for computer systems with simplified authority control.

Another objective of the invention is to provide a data file editing device for computer systems that allows users to allocate desired editing pages easily.

Another objective of the invention is to provide a data file editing device for computer systems where operations for utilizing data files and for editing data files are separated.

SUMMERY OF THE INVENTION

According to the present invention, a data file editing device for computer systems is provided. The data file editing device for computer system is in connection with a computer system comprising at least one central processing unit, a displaying device, input means and a storage device. The data file editing device for computer systems of this invention allows users to create new data files, to retrieve data files from the computer system, to edit the data files and to save the data files in the computer system and comprises:

a user interface controller in connection with the input means and the displaying device of the computer system, to provide in the displaying device of the computer system a display page, comprising at least one displaying region, a data utilization operation region and a data edition operation region, and to allow a user to view and to edit content of selected data files stored in the storage of the computer system;

a data utilization controller in connection with the computer system, to define a data file classification structure connected to particular data files stored in the storage of the computer system, to display at least a part of the data file structure in the data utilization operation region in the display page and to obtain and display content of a data file in the displaying region of said display page, after a representation of the data file or representation of a class in the data file classification structure, displayed in the data utilization operation region, is selected by the user;

a data edition controller in connection with the computer system, to define an edition table classification structure connected to particular edition tables defining particular edition functions and connecting particular content of particular data files stored in the storage of the computer system, to display at least a part of the edition table classification structure in the data edition operation region of the display page, to connect and display content of an edition table and the particular content of the particular data files in the displaying region, after representation of an edition table or representation of a class in the edition table classification structure, shown in the edition operation region, is selected by the user, and to store edited data of the edition table into the connected data files; and a temporary memory to store the content of the particular data files being selected and data and instructions to be input by the user;

characterized in that the data file classification structure and the edition table classification structure are display in separate operation regions in the display page and that alterations of the content of the data file being displayed by the data utilization controller are not allowable.

In some embodiments of this invention, the data file classification structure comprises a hierarchic structure and items of at least one level of the hierarchic structure are displayed. Items of a sub-level class belonging to a class in the level being displayed are displayed when the class is selected, unless the sub-level does not exist. In some other embodiments, the edition table classification comprises a hierarchic structure and items of at least one level of said hierarchic structure are displayed. Items of a sub-level class belonging to a class in the level being displayed are displayed when the class is selected, unless the sub-level does not exist.

These and other objectives and advantages of this invention may be clearly understood from the detailed description by referring to the following drawings.

DETAILED DESCRIPTION OF THE INVENTION

In the followings, detailed description of the data file editing device for computer systems will be given. It is noted that the data file editing device of the present invention may edit all kinds of files, including files that contain pure data and other contents. For example, files containing computer programs may be edited by using the editing system of this invention. Other files that contain any digitized information and need to be edited, displayed and utilized may also be edited using the editing system of this invention.

In the following detailed description, the concept of "editing" or "edition" of a data file may include the operation of "utilizing" or "utilization" of the data file. When it pertains to "editing" or "edition" itself, it may include the operations of initializing, retrieving, modification, adding, deleting, copying, moving, transmission, alignment and realignment, restore etc. of data files or data of a data file, relating to alterations in the address, structure, content or else of computerized files. The term "utilizing" or "utilization" pertains to operations bases on the content of a data file and shall include displaying, viewing, generating figures, calculation, comparison, analysis, inference, generating suggestions etc.

The data file editing device for computer systems of this invention is used in connection with a computer system, in particular, with data files of the computer system. The editing system for computer systems of this invention allows users to create a new data file, to retrieve a data file from the computer system, to utilize and to edit content of the data file and to save the data file in the computer system. The data file editing device for computer systems of this invention may be realized in the form of a hardware circuit, a hardware in combination with software or a computer program that may be installed in a computer system and use the resources of the computer system, such as the calculation function, the storage function, the memory function, the input/output function, the display function etc., to provide the functionalities of the present invention.

Figure 1:
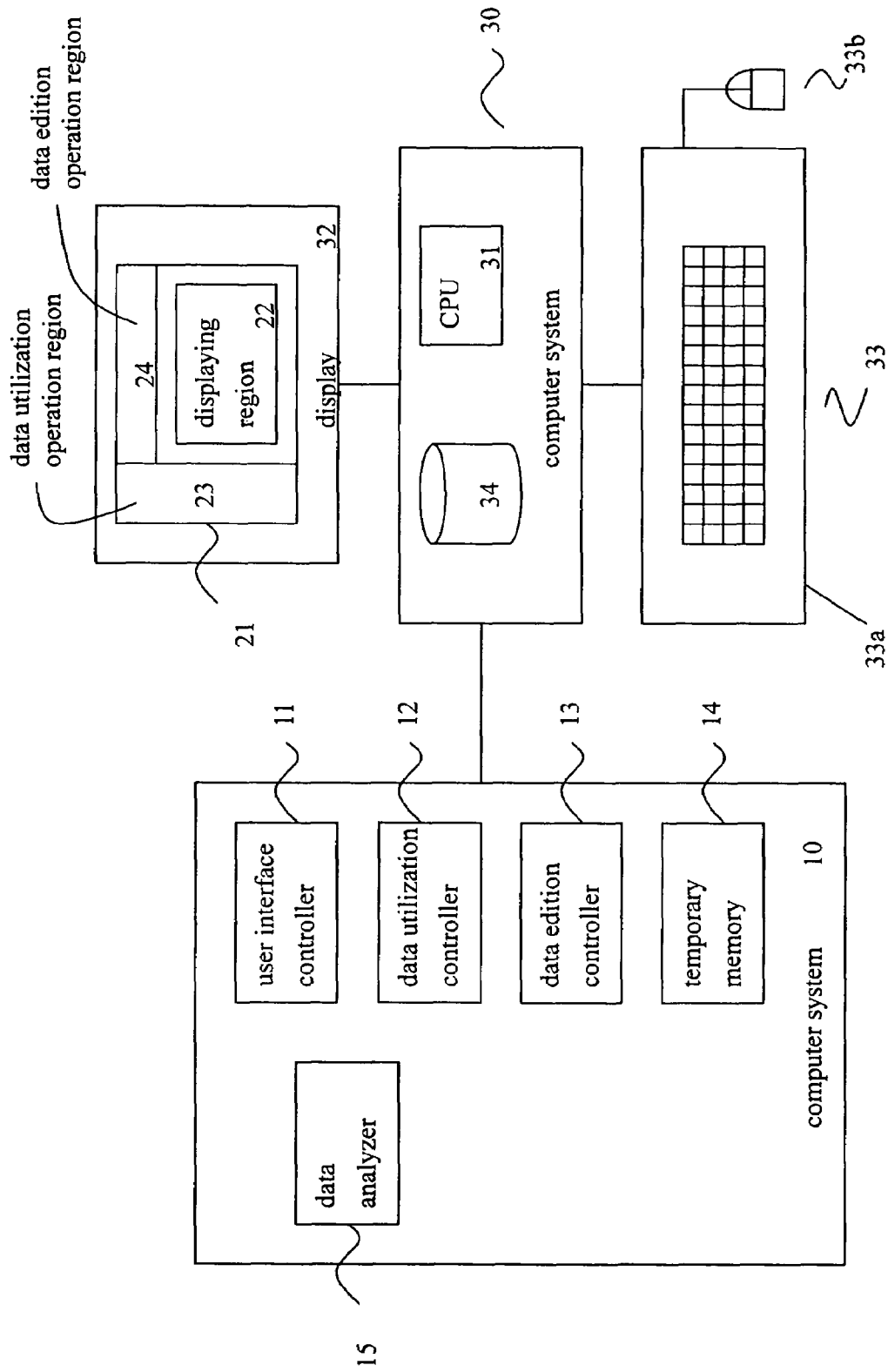
FIG. 1 shows the systematic diagram of the data file editing device for computer systems of this invention.

FIG. 1 shows the systematic diagram of the data file editing device for computer systems of this invention. As shown in the figure, the invented data file editing device for computer systems 10 is in connection with a computer system 30. The computer system comprises: a central processing unit 31, a display 32, input means 33 including a keyboard 33a and a mouse 33b, and a storage device 34. The data file editing device of this invention comprises: a user interface controller 11, a data utilization controller 12, a data edition controller 13 and a temporary memory 14.

The user interface controller 11 connects the displaying device 32 and the input means 33 of the computer system 30. The user interface controller 11 defines and provides a display page 21 in the displaying device 32 of the computer system 30. The display page 21 includes at least one displaying region 22, a data utilization operation region 23 and a data edition operation region 24. The user interface controller 11 provides at least displaying functions and edition functions. Content of selected data files are displayed in the displaying region 22. The user interface controller 11 connects the input means 33 of the computer system 30, so that users may input instructions and data relating to utilization or edition of data files. Content of data files being created or retrieved and data being input, in connection with the data files, are displayed in the display page 21. Therefore, users are allowed to view and edit content of data files through the user interface controller 11.

The data utilization controller 12 defines a data file classification structure for particular data files stored in the storage 34 of the computer system 30. The content of the data file structure, or a part of the content, is displayed in the data utilization operation region 23 of the display page 21. When a user selects a file from an item of the data file classification structure from the data utilization operation region 23, the data utilization controller 12 accesses the data file from the storage 34 of the computer system and displays the content of the retrieved file in the display region 22 of the display page 21. In the embodiment of this invention, the user selects a data file by simply clicking on representation of the data file in the data utilization operation region 23. Users may utilize content of the displayed data file, including displaying, viewing, comparing and analyzing the content or generating figures, calculating results, analysis results, inference results or suggestions etc. from the content, as they wish. The data utilization operation region 23 may provide function keys (not shown) in connections to display and other utilization functions, including the above-mentioned functions, of the content being displayed. In the data utilization controller 12 no function relating to alterations of the content of the data files is provided.

The data edition controller 13 defines an edition table classification structure for particular edition tables and templates of edition tables stored in the storage 34 of the computer system 30. The definitions of the edition tables include particular edition functions and data files connected to the particular edition table. The edition functions may include the operations of: initializing, retrieving, modification, adding, deleting, copying, moving, transmission, alignment and realignment, restore etc. of data files or data of a data file. The modification functions may include any operation that alters the address, structure, content or else of computerized files. The content of the edition tables is displayed in the edition operation region 24 of the display page 21. The content of the edition table may include form of an edition table, representatives of edition functions of the edition table and particular content of data files in connection with the edition table. The particular content of the connected data files is displayed in the form of the edition table, included in a frame or in a plurality of columns. An edition table is displayed when the representation of the edition table or representation of a class in the edition table classification structure connected to the edition table, as shown in the edition operation region 24, is selected by the user. In the data edition operation region 24, function keys (not shown) in connection with editing functions provided by the data edition controller 13 may be provided. Users may click the function keys in order to edit the content of a edition table. In some embodiments of the present invention, users simply edit the content of the edition table by selecting a column and input data into the column. The data edition controller 13 obtains the input data and modifies or otherwise alter related the content of the edition table being edited according to definitions of the column. The edition table having been edited is stored by the data edition controller 13 in the storage 34 of the computer system 30 as a data file.

The temporary memory 14 may be a memory device provided in the data file editing device of the invention or a buffer memory provided in the computer system 30. The temporary memory 14 stores the content of the data file being selected and data and instructions that the user inputs.

One important feature of the present invention is that the data file classification structure and the edition table classification structure are display in separate operation regions in the display page 21. In other words, the data file classification structure is displayed in the data utilization operation region 23 and the edition table classification structure is display in the data edition operation region 24. When content of a data file is displayed by the data utilization controller 12, alterations of the content of the date file are not allowed.

In sum, the editing system for computer systems of the present invention provides a user interface. The user interface includes a display page 21 and input means 33 including a keyboard 33a and a mouse 33b. The display page includes at least one displaying region 22, one data utilization operation region 23 and a data edition operation region 24. The data utilization operation region 23 is in connection with data files in the storage 34 of the computer system 30. Content of the data files may be displayed or otherwise utilized according to the user's operations in the data utilization operation region 23. The data edition operation region 24 is in connection with templates of edition table and content of data files. Contents of data files may be edited by authorized users according to their operations in the data edition operation region 24. When the content of a data file is displayed pursuant to operations in the data utilization operation region, alterations to the content are not allowable. Thus, the utilization and the edition of the content of the data files are initialized by operations in separate operation regions.

In the embodiments of the present invention, the way the data utilization operation region 23 is in connection with the data files and the way the data edition operation region 24 is in connection with the data files may be identical or different. In some embodiments of this invention, the data file classification structure and the edition table classification structure respectively comprise a hierarchic structure. Items of at least one level of the hierarchic structure are displayed in the data utilization region 23 as default. Items of a sub-level class belonging to a class in the level being displayed are displayed when the class is selected. When the sub-class is a collection of data files, the file names or other representatives are displayed. In order to select a class, the user simply clicks on the representative of the class, or moves the cursor to the location of the class.

In the followings, an example of the data file editing device for computer systems of this invention, as used in a production control system, will be described. It shall be understood that the application of the present invention is not limited to the production control system. It may be used to edit and utilize any data file that is in connection with or may be used by a computer system.

Figure 2:
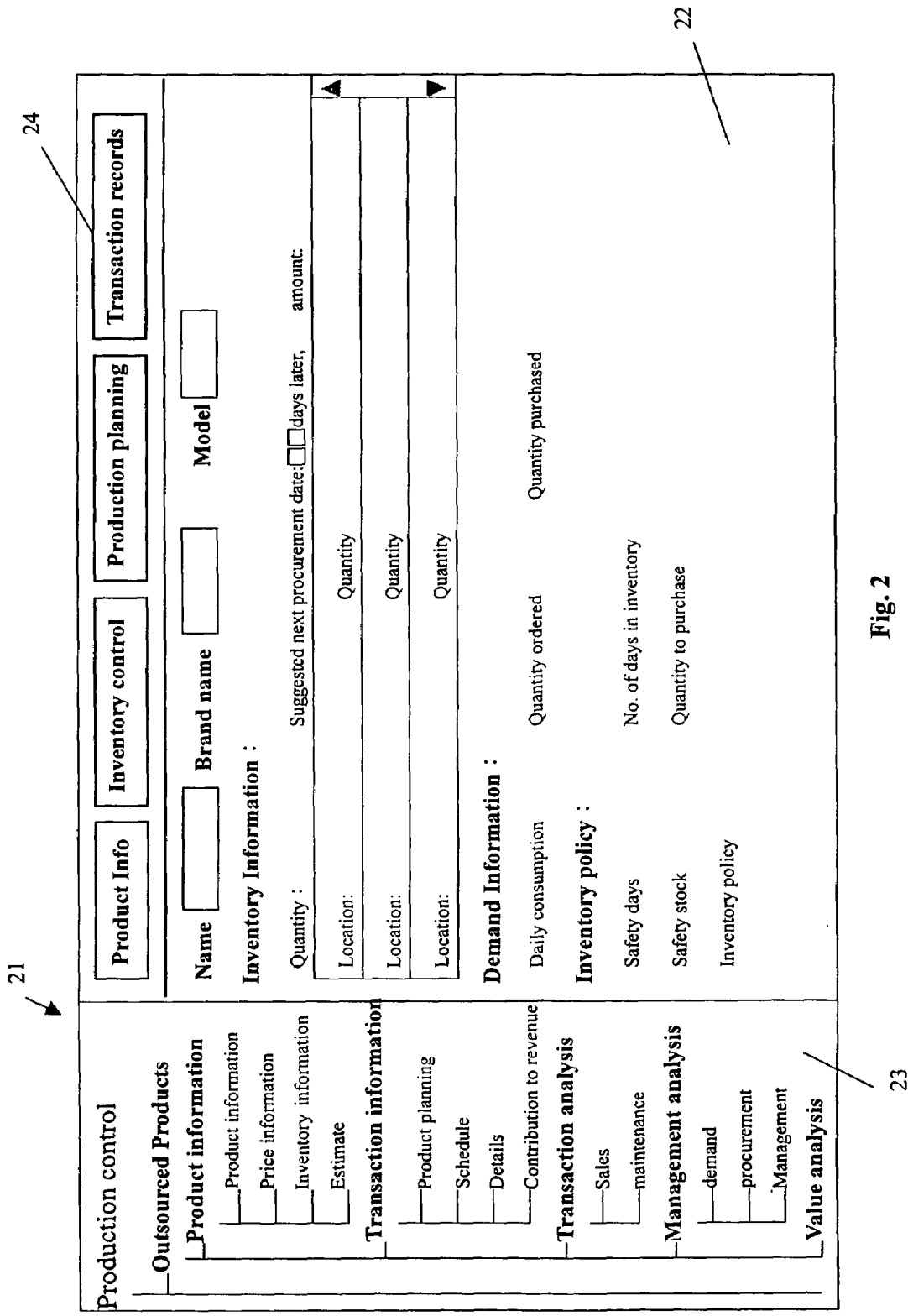
FIG. 2 shows the display page of the user interface of the data file editing device for computer systems when used in a production control system.

FIG. 2 shows the display page of the user interface of the data file editing device for computer systems when used in a production control system. In this figure, elements identical to that of FIG. 1 are labeled with the same numbers. As shown in this figure, the display page 21 of the accounting system includes a display region 22, a data utilization operation region 23 and a data edition operation region 24. In the display region 22 the "Inventory information" of a particular component is shown. The inventory information is displayed in an edition table. Data being displayed in the table include: name or other identity of the component, current quantity, location of inventory and inventory policies, and other information. When the user selects this data file from the data edition operation region 24, these data along with the edition table are displayed in the display region 22 of the display page 21. When the user selects this data file from the data utilization operation region 23, similar information may be displayed in the display region 22 of the display page 21. However, the user will not be allowed to edit or otherwise alter the information as displayed. Thus, the user may easily perceive the most updated inventory information of this particular component.

In the data utilization operation region 23 of the display page 21, the first and second levels of a tree structure is shown. The tree structure represents the classification system of all components in inventory. In the figure, the first level of the classification system includes all items under the class of "Production Control". They are: "Outsourced Products" and "Manufactured Products". Under this level, some sub-leveled classes are shown. They include: product information, transaction information, opinions and analyses, management information, value information etc. Under this level, third leveled classes, as well as independent data files and definition files related to these files, are included. In this figure, the classification structure of a data file classification system used in the "Production Control" of an account system is shown. The classification structure is a four-leveled structure. Of course, other classification systems, classification structure or data file connection systems may also be used. Generally speaking, in the present invention, the classification structure is preferably a hierarchic system. However, this is not any limitation of the present invention.

As shown in this figure, in the data edition operation region 24 the first level of the edition table classification system is shown. In this level, the classes are: basic settings, production information, inventory control, production plan, schedule of transactions, transaction records, records of adjustment, working tables etc. As described above, these items are only illustrations of an editing table classification system that may be used in the production control system. Generally speaking, in the present invention, the classification structure is preferably a hierarchic system. However, this is not any limitation of the present invention. Other classification structures and displaying methods may also be used in the present invention. As stated above, the content of the data files may be displayed in the format of a table, even under the operations in the data utilization operation region 23. In that case, the table under the operations of the data utilization operation region 23 may be identical to the corresponding edition table under the operations of the data edition operation region 24, under the identical or different classification systems. Generally speaking, the classification and the arrangements of the tables to be displayed under the operations of the data edition operation region 24 are preferably designed according to the convenience of the users, not as the classification system of the data files as they are stored in the computer system 30. As a result, users may easily and rapidly collocate and obtain the desired content of the data files or the desired edition tables.

Figure 3:
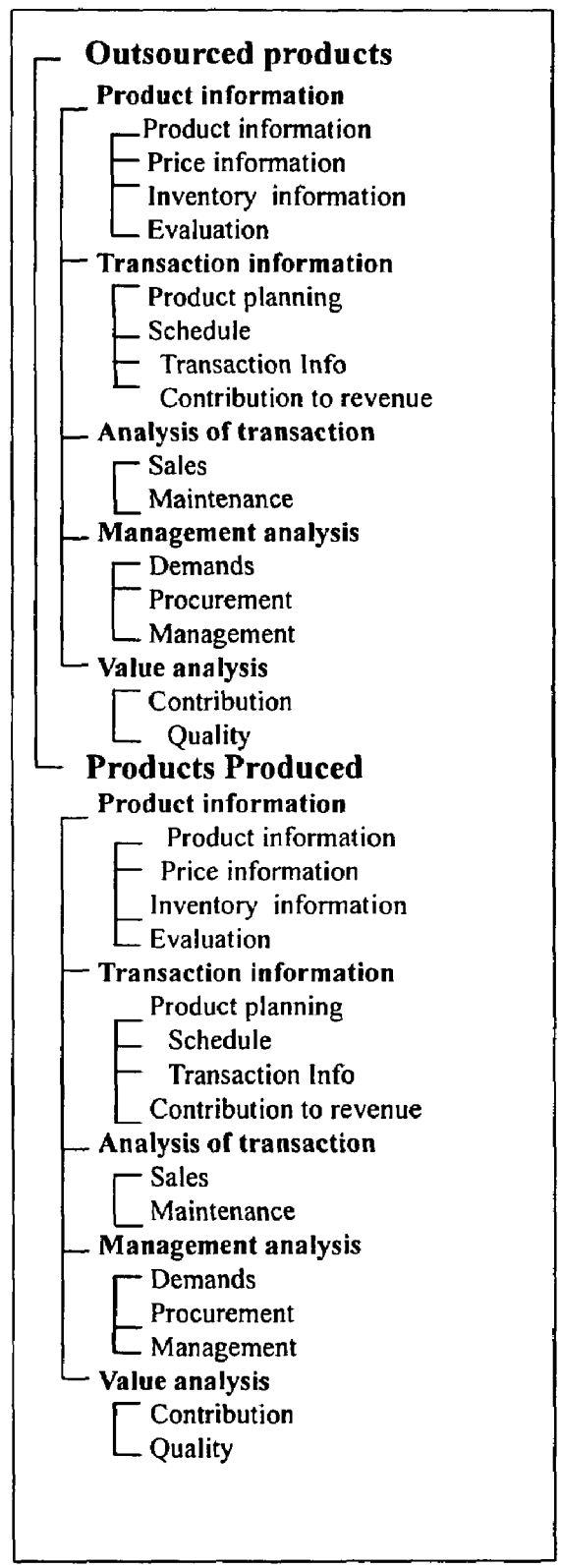
FIG. 3 shows the classification structure of edition tables provided in the data edition operation region of the production control system of FIG. 2.

FIG. 3 shows the classification structure of edition tables provided in the data edition operation region of the production control system of FIG. 2. In this figure, a plurality of useful tables is shown for reference.

Figure 4:
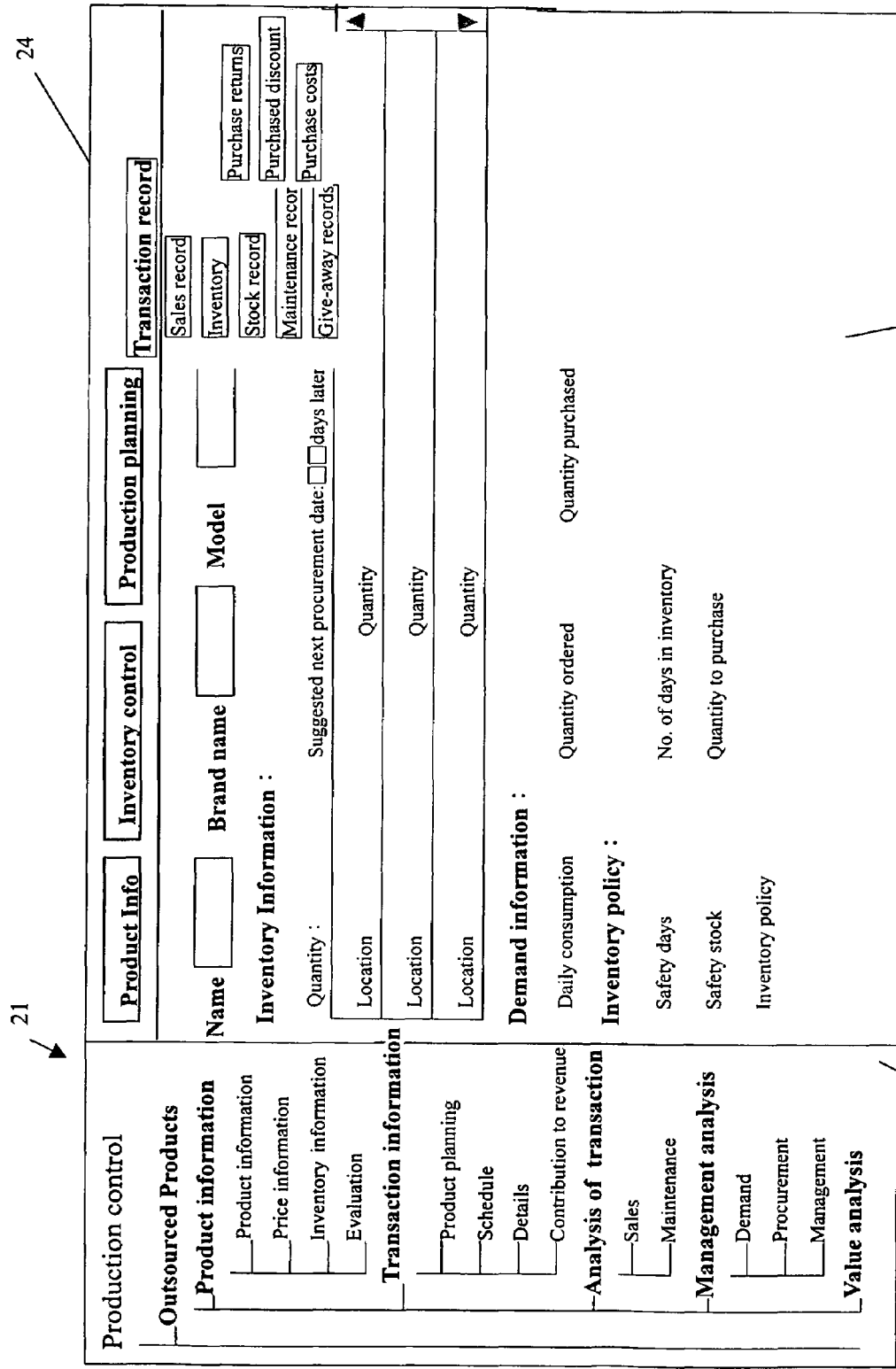
FIG. 4 shows the first step of an edition operation, when the edition table of "purchase costs" of the production control system will be used.
Figure 5:
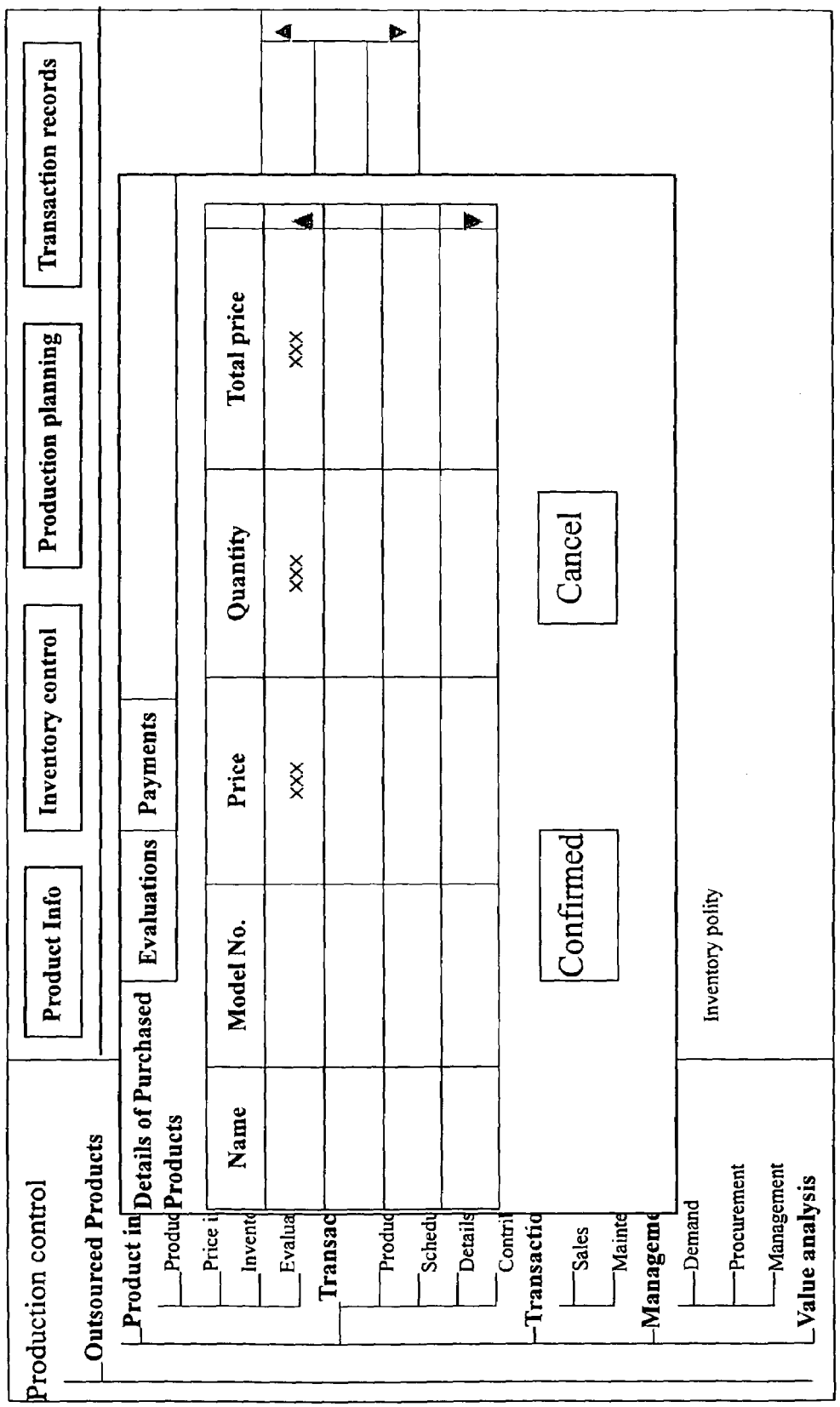
FIG. 5 shows the edition table of "purchase costs" in the edition operation.

FIG. 4 shows the first step of an edition operation, when the edition table of "purchase costs" of the production control system will be used. As shown in this figure, when the user wishes to edit the edition the "purchase costs" of a component, in the first level of the classification structure as shown in the data edition operation region 24, the item of "Transaction Records" shall first be selected. Upon selection, items under this class are shown. They are: "sales records", "purchase records", "maintenance records" and "give-away records". Thereafter, the user selects the item of "purchase records" and the four classes under this class are shown: "purchase records", "purchase return", "purchase discount" and "purchase costs". When the user selects the item of "purchase costs", the template of the edition table of "purchase costs" and the content of the related data file(s) are retrieved from the storage 34 of the computer system 30 and display in combination in the display region 22 of the display page 21. FIG. 5 shows the edition table of "purchase costs" in the edition operation. As shown in this figure, the edition table of "purchase costs" includes three pages. They are: page 1 "details of purchased product", page 2 "calculations" and page 3 "payments". FIG. 5 shows the first page. In this edition table 2 function keys are provided: "confirmed" and "cancel". Then all data are input into the edition table and the "confirmed" key is clicked, the data edition controller 13 determines that an edition operation is completed and stores the input data into the storage 34 of the computer system 30, as a new data file or in the data file as previously retrieved. The edition of the edition table is thus completed.

In addition to adding new data, the edition table allows users to modify, delete, copy, move data, or eve to alter the classification system or the linkage information, of data files in a similar manner.

The present invention provides a displaying page wherein a plurality of operation regions 23, 24 is provided. Users are allowed to initialize the data utilization operations through the data utilization operation region 23 and the data edition operations though the data edition operation region 24. The data utilization controller 12 obtains content of data files from the computer system 30 and displays the obtained content in the display region 22 for the user's review or otherwise utilizations. The data edition controller 13 on the other hand provides templates of edition table and connections of data files. When the user selects an edition table, content of the table is assembled and shown in the display region 22 to accept edition operation. Edition tables having been edited are stored in the storage 34 of the computer system 30. The temporary memory 14 stores data of data files being edited or displayed. These controllers and memory may be accomplished by those skilled in the art according to the description of the present invention. Details of these controllers and memory are thus omitted.

In the above description, the phrase "displayed in the display region 22" does not mean displaying the table or the content strictly within the frame of the display region 22. When displaying, the display region may be expanded to overlap the operation regions 23 and 24, since the function keys or virtual keys in these regions 23, 24 are not in function.

In one embodiment of the present invention, an additional data analyzer 15 may be provided to allow the user to generate statistic, analytic, comparison and inference information or decisions and suggestions, based on the data of data files obtained by the data utilization controller 12. Such data analyzer 15 may be accomplished by those skilled in the art bases on the existing technologies.

In the present invention, edition of data files and utilization of data file are operated through separate entrances. Authority control of data files is thus made easily. In addition, the classification structures as shown in the operation regions 23 and 24 of the display page 21 are designed according to the convenience of the user, not the classification of the data files in the storage 34. Access of data files and edition tables is thus made easy. All data after edition may be easily accessed and displayed, upon saving of the result of the edition. Data files may thus be updated speedily.

As the present invention has been shown and described with reference to preferred embodiments thereof, those skilled in the art will recognize that the above and other changes may be made therein without departing form the spirit and scope of the invention.

What is claimed is:

1. A data file editing device for computer systems in connection with a computer system comprising at least one central processing unit, a displaying device, input means and a storage device; said data file editing device allowing users to create new data files, to retrieve data files from said computer system, to edit said data files and to save said data files in said computer system and comprising:

a user interface controller in connection with said input means and said displaying device of said computer system, to provide in said displaying device of said computer system a display page, comprising at least one displaying region, one data utilization operation region and one data edition operation region, and to allow a user to view and to edit content of selected data files stored in said storage of said computer system;

a data utilization controller in connection with said computer system, to define a data file classification structure connected to particular data files stored in said storage of said computer system, to display at least a part of said data file structure in said data utilization operation region in said display page and to obtain and display content of a data file in said displaying region of said display page, after a representation of said data file or representation of a class in said data file classification structure, displayed in said data utilization operation region, is selected by said user;

a data edition controller in connection with said computer system, to define an edition table classification structure connected to particular edition tables defining particular edition functions and connecting particular content of particular data files stored in said storage of said computer system, to display at least a part of said edition table classification structure in said data edition operation region of said display page, to connect and display content of an edition table and said particular content of said particular data files in said displaying region, after representation of an edition table or representation of a class in said edition table classification structure, shown in said edition operation region, is selected by said user, and to store edited data of said edition table into said connected data files; and a temporary memory to store said content of said particular data files being selected and data and instructions to be input by said user;

characterized in that said data file classification structure and said edition table classification structure are display in separate operation regions in said display page and that alterations of said content of said data file being displayed by said data utilization controller are not allowable.

2. The data file editing device for computer systems according to claim 1, further comprising a data analyzer to allow said user to generate statistic, analytic, comparison and inference information or decisions and suggestions, based on said content of data files obtained by said data utilization controller.

3. The data file editing device for computer systems according to claim 1, wherein said data file classification structure comprises a hierarchic structure and items of at least one level of said hierarchic structure are displayed in said data utilization operation region, wherein items of a sub-level class belonging to a class in said level being displayed are displayed when said class is selected, unless said sub-level does not exist.

4. The data file editing device for computer systems according to claim 3, wherein said data file classification structure comprises a tree type structure.

5. The data file editing device for computer systems according to claim 1, wherein said edition table classification comprises a hierarchic structure and items of at least one level of said hierarchic structure are displayed in said data edition region, wherein items of a sub-level class belonging to a class in said level being displayed are displayed when said class is selected, unless the sub-level does not exist.

6. The data file editing device for computer systems according to claim 5, wherein said edition table classification structure comprises a tree type structure.

* * * * *